June 6, 1961
H. E. CHACE ET AL
2,987,598
DEVICES FOR SEVERING PLASTIC MATERIAL
Filed May 9, 1958
3 Sheets-Sheet 1
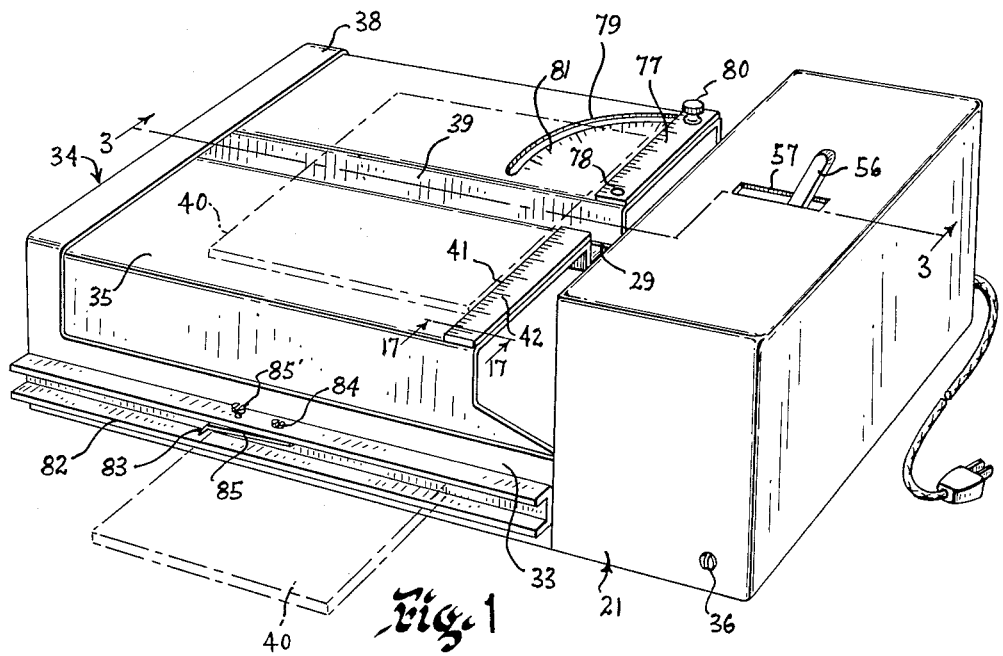
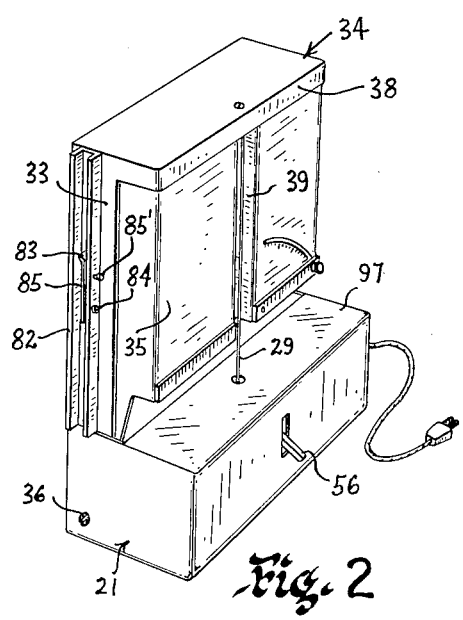
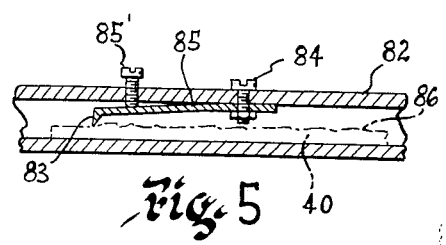
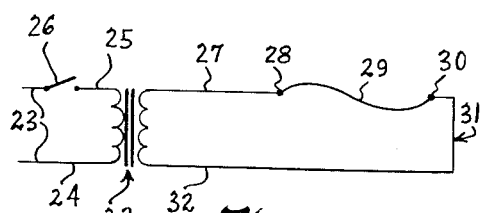
INVENTORS
HOWARD E. CHACE
ROBERT E. HAYNES
CHESTER B. DERR
BY BERNARD P. GAGNON
*Louis L. Gagnon*
ATTORNEY INVENTORS
HOWARD E. CHACE
ROBERT E. HAYNES
CHESTER B. DERR
BERNARD P. GAGNON
BY Louis L. Gagnon
ATTORNEY

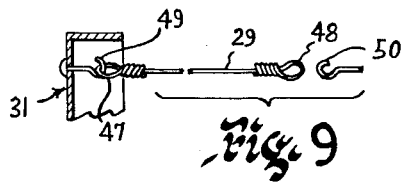
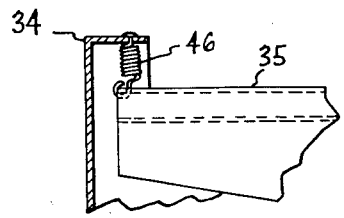
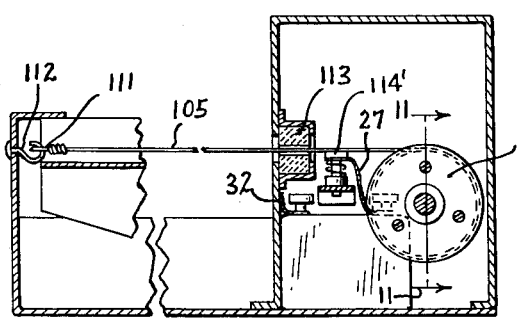
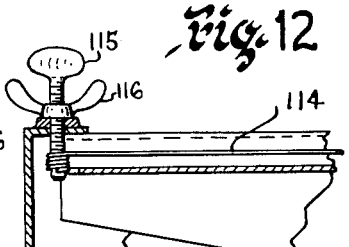
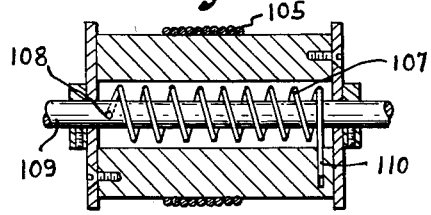
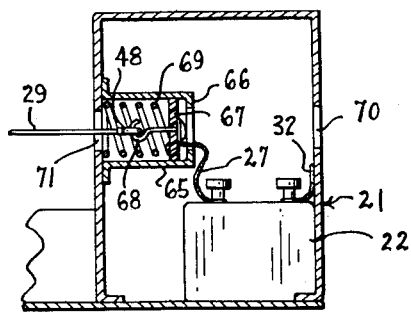
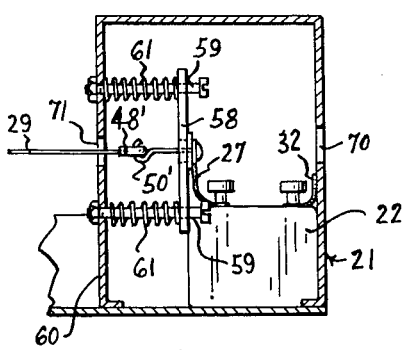
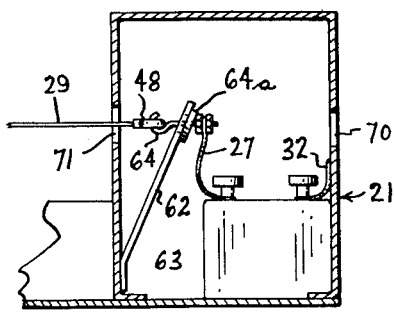
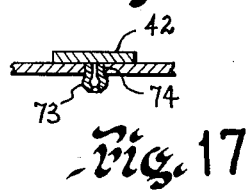
INVENTORS
HOWARD E. CHACE
ROBERT E. HAYNES
CHESTER B. DERR
BERNARD P. GAGNON
BY
ATTORNEY

United States Patent Office 2,987,598
Patented June 6, 1961

2,987,598
DEVICES FOR SEVERING PLASTIC MATERIAL
Howard E. Chace, 741 South St., and Robert E. Haynes, 114 Litchfield Ave., both of Southbridge, Mass.; and Chester B. Derr, Box 58, South Woodstock, Conn.; and Bernard P. Gagnon, Box 155, Quinebaug, Conn.
Filed May 9, 1958, Ser. No. 734,311
11 Claims. (Cl. 219—19)

The present invention is directed particularly to the provision of novel means for cutting plastic material with ease and accuracy such, for example, as plastic tile which is presently being used to a considerable extent instead of ceramic tile in bathroom trimmings or the like.

One of the major problems in cutting sheet material such as plastic tile has been that of forming neat and accurately located cuts as well as irregular contoured cuts whereby the parts may be intimately and accurately fitted in position of use.

It, therefore, is one of the primary objects of this invention to provide simple and accurate means for performing such cuts with a major degree of accuracy and ease.

Another object is to provide a device for cutting articles formed of materials responsive to heat such as styrene products, thermoplastics, or other similar materials whereby the cutting is accomplished by an electrically heated taut resistance wire.

Another object is to provide materials responsive to heat through the use of a heated taut resistance wire whereby materials such as polystyrene, thermoplastic or the like may be cut along relatively straight lines or along lines of irregular contoured configurations.

Another object is to provide a device of the above character wherein the heated wire, prior to performing the cut, is protected from air currents whereby it will be heated and retained at an initially high temperature.

Another object is that of providing an arrangement whereby heat may be directed to a particular area of plastic material such as plastic tile for the purpose of making an accurate bend therein.

Another object is to provide means in a device of the above character for predetermining the location of cut and the resultant size of the article being formed.

Another object is to provide in a device of the above character means whereby the high resistance wires may be readily interchanged.

Another object is to provide means in a device of the above character for compensating for wire expansion or lengthening due to heat whereby the said wire is automatically maintained taut.

Other objects and advantages of the invention will become apparent from the following description taken in conjunction with the accompanying drawings wherein:

FIG. 1 is a perspective view of a device embodying the invention showing its position of use for making straight line cuts through plastic sheeting;

FIG. 2 is the device of FIG. 1 showing its position of use for making odd shaped cuts in plastic sheeting;

FIG. 5 is a fragmentary sectional view of a scraper arrangement embodied in the invention;

FIG. 6 is a schematic view of the wiring system of the devices embodying the invention;

FIG. 9 is a fragmentary view showing the attachment ends of the cutting wire of the invention;

FIGS. 10 and 11 are fragmentary sectional views illustrating a further modification of the invention;

FIG. 12 is a fragmentary sectional view of a modified form of cutting table tensioning means;

FIGS. 13 through 16 are fragmentary sectional views showing modified forms of wire tensioning means;

FIG. 17 is a fragmentary sectional view taken as on line 17—17 of FIG. 1 and looking in the direction indicated by the arrows.

Figure 3:
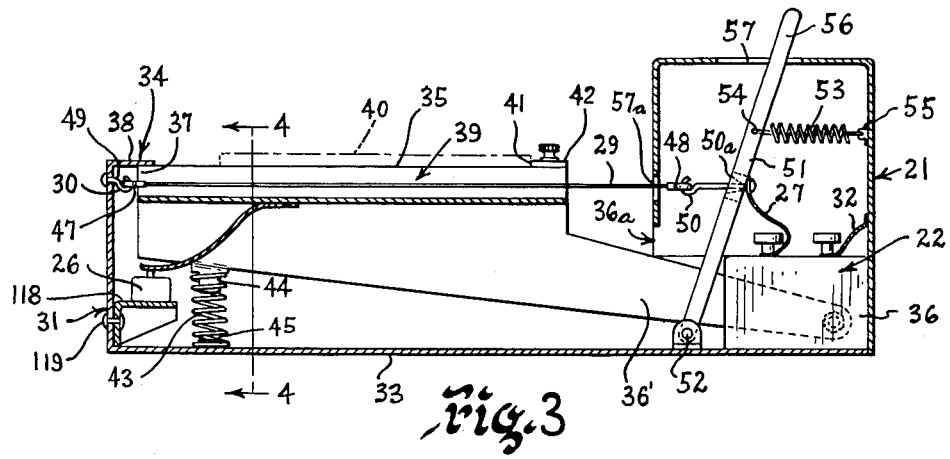
FIG. 3 is a sectional view taken on line 3—3 of FIG. 1 and looking in the direction indicated by the arrows.

Referring to the drawings wherein like characters of reference designate like parts throughout the several views, one of the devices embodying the invention is shown particularly in FIGS. 1, 2, 3 and 4 comprises a housing 21 in which is supported a transformer 22 having, as shown diagrammatically in FIG. 6, an electrical connection to an A.C. or other suitable source of power 23 through the lead wires 24 and 25.

The lead wire 25, as shown in FIG. 6, is provided with a switch 26 whereby the transformer 22 may be energized or de-energized as desired. The transformer is connected through the lead wire 27 to one end 28 of a fine resistance wire 29 such as Nichrome V metal or the like. The said fine resistance wire 29 has its opposed end 30 connected to a ground 31 which is, in turn, connected by the lead wire 32 to said transformer 22. When the switch 26 is closed, the wire 29 is adapted to be electrically heated to a temperature sufficient to cut through the plastic sheeting.

The housing 21 is carried by a base 33 having an upwardly extending hand rest end portion 34 on its end opposite the housing 21. The base 33 has a platform 35 pivotally connected thereto at spaced points 36 (FIG. 3) by means of spaced reduced portions 36' which extend through an opening 36a in the adjacent side wall of the housing whereby the said platform may be raised or lowered with respect to the fine resistance wire 29. The said platform has its end 37 opposite its pivots 36 extending beneath an upper lip portion 38 on the hand rest portion 34 so as to limit its upward movement relative to the base. When in this position, the said platform is disposed in a plane substantially parallel with and above the fine resistance wire 29. This is made possible by the provision of a centrally disposed longitudinal channel 39 in said platform through which the fine resistance wire 29 normally extends when the platform is in its uppermost position. The wire 29 lies inwardly of the channel and is protected against circulating air thereby permitting the wire to reach and maintain maximum temperature.

The tile or other plastic sheeting to be cut, as shown by the dash lines 40 in FIG. 1, is adapted to be rested on the top of the platform 35 with an edge thereof engaging the side edge 41 of a removable scale 42 by means of which the location of cut to be made in the plastic sheeting may be accurately determined so that the piece of said plastic tile or sheeting will be of the accurate size desired. The scale 42 may be removably attached to the platform by providing it with spaced expansion pins 73 frictionally fitting in spaced openings 74 formed in said platform as shown in FIG. 17. The platform 35 is normally held, as shown in FIG. 3, in raised position by compression springs or the like 43 fitting over depending pinlike members 44 carried by the platform and similarly located pinlike members 45 carried by the base 33.

When it is desired to cut the plastic sheeting after it has been properly located on the platform 35, all that is required is to rest your hands on the hand rest portion 34 and, with your fingers, exert a pressure on the sheeting and platform at the opposed sides of the electrically heated resistance wire 29. In this manner the said platform will be depressed together with said plastic sheeting 40 against the action of the springs 43 whereby the said sheeting will engage the electrically heated resistance wire and the said wire will cut through the plastic. The speed of cut is regulated by the extent of pressure and is controlled so as to avoid strain on the wire 29 and also to avoid burning the plastic.

Figure 4:
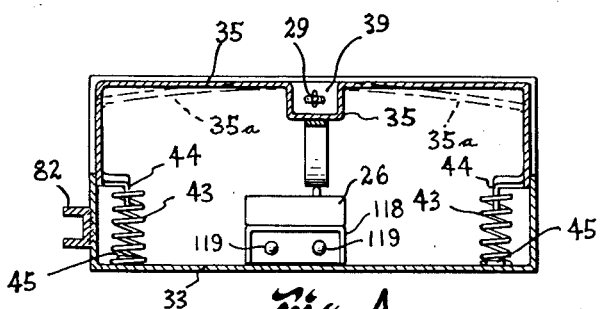
FIG. 4 is a sectional view taken as on line 4—4 of FIG. 3 looking in the direction indicated by the arrows.

If desired, in order to insure quicker separation of the cut sections of the plastic, the platform 35, as shown by the dash lines 35a in FIG. 4 on the opposite sides of the cutting wire 29, may be slightly angled in a downward and outward direction. This causes the sections of the initially flat plastic sheet to tilt downwardly to the angles of the platform upon being severed by the wire 29 and insures more complete separation.

While it has been stated that the cutting of the tile sheeting 40 may be performed by placing the said tile sheeting on the platform over the electrically heated resistance wire 29 and by thereafter moving the sheeting downwardly with the platform to cause the wire to engage and cut the tile, the platform 35 may be initially depressed, after the wire 29 has become sufficiently heated, an amount sufficient to permit the plastic tile or sheeting 40 to be placed beneath the wire and at the proper location relative thereto. The downward pressure on said platform may then be released to allow the coil springs 43 to force the platform and the tile located thereon upwardly through the heated wire 29 to make the cut.

It is further pointed out that instead of using compression springs 43 to raise the platform 35, tension springs or the like 46 might be used, as shown in FIG. 12.

While it has been stated above, as shown in FIG. 6, that the fine resistance wire 29 is attached at one end 28 to a lead 27 connected to the transformer 22 and at its opposed end 30 to a ground 31, the said wire embodied in the presently described device is preferably provided with looped ends 47 and 48 which may be connected respectively to a hook 49 carried by the hand rest or shelf 34 and a hook 50 carried by a lever 51 pivotally attached at 52 to the base 33. A tension spring 53 is attached at one end 54 to the lever 51 and at its opposed end 55 to the side wall of the housing 21, as shown in FIG. 3 to keep the cutting wire 29 taut. The hook is supported by suitable insulation means 50a carried by the lever 51 to insulate the hook from said lever. The hook 50 is in turn connected to the transformer 22 by the lead wire 27.

The tension spring 53 is adapted to exert a pulling action on the lever 51 which, in turn, causes the hook 50 to exert a constant pulling action on the fine resistance wire 29 to keep the same taut throughout the use of the device and to compensate for wire expansion or lengthening due to heat. The lever 51 has an upper end 56 extending outwardly of a slot 57 in the upper wall of the housing 21 whereby it may be manually operated to move the lever against the tensioning action of the spring 53, so that the looped end 48 of the wire 29 and the hook 50 may be moved outwardly of an opening 57a in the side of the housing 21 whereby the looped end 48 may be detached from the hook 50 when it is desired to change or replace the wire 29.

In FIG. 13 there is shown a modified arrangement for tensioning the wire 29 which comprises a plate 58 of insulation material carrying a hook 50' to which the looped end 48' of the wire 29 is attached. In this instance the plate 58 is provided with spaced openings adjacent its opposed ends through which spaced guide pins 59, carried by the housing 21, extend. On each of the guide pins, intermediate the plate 58 and the adjacent wall 60 of the housing, are positioned compression springs 61 for constantly urging said plate away from the wall 60 whereby the wire 29 is constantly tensioned.

A further modification, as shown in FIG. 16, is the provision of a blade spring 62 having its lower end 63 attached to the lower wall of the housing 21 and having a hook 64 adjacent the upper end thereof onto which the loop 48 of the wire 29 may be placed. The hook 64 is supported by a member 64a formed of insulation material and carried by the blade spring 62 to insulate the hook from said blade spring.

Another modification is shown in FIG. 15 which comprises a cylindrical member 65 having a partially closed end 66 and in which is positioned a round disc 67 of insulation material carrying a hook 68 to which the looped end 48 of the wire 29 may be attached. Surrounding said hook 68 intermediate said disc 67 and the adjacent wall of the housing is a compression spring 69 adapted to constantly urge the disc in a direction away from said adjacent wall of the housing to thereby maintain a tension on the wire 29.

In each of the above constructions shown in FIGS. 13, 15 and 16 the housing 21 is provided with an opening 70 in aligned relation with the plate 58, spring 62 and the disc 67 in the cylindrical housing 65 to provide means for gaining access to said members by extending a rod, screw driver or the like through the opening 70 to engage and force the said members against the tension of the springs whereby the hooks 50', 64 and 68 may be pressed outwardly of the openings 71 so that the looped end 48 may be easily removed from or placed on the hooks.

As shown in FIG. 1 one side of the platform 35 may be provided with a removable graduated straight edge 77 which is pivotally attached at 78 to said platform so that it may be swung to different angular positions. In this instance, the platform 35 is provided with an arcuate slot 79 having its center of curvature coincident with the center of the pivot 78. The graduated straight edge is provided with a nut and bolt arrangement 80 adjacent its end opposite the pivot 78 which extends through said slot 79 so that the straight edge 77 may be locked in different angular positions. A suitable protractor 81 is provided along one of the edges of the curved slot to determine the angle of disposition of said straight edge. This arrangement is for the purpose of making different angular cuts in the plastic tile or sheeting.

As shown in FIGS. 1, 4 and 5, the base 33 may be provided with a channel 82 in the side thereof into which a suitable scraping blade 83 may be disposed and held by a clamp screw 84 extending through the spring shank portion 85 of said blade and attached to the adjacent wall of the base. The scraper 83, as diagrammatically illustrated in FIG. 5, is for the purpose of removing any material or burr 86 which may be deflected in a sidewise direction of the plastic sheeting 40 during the forming of the cut in said plastic sheeting and performs its function by merely placing the burred end of the plastic tile or sheeting 40 inwardly of the channel 82 beneath the scraper 83 and then drawing the tile or sheeting transversely of the blade by moving said sheeting longitudinally of the channel 82. The tension on the spring shank 85 may be varied by an adjustable screw 85'.

Figure 8:
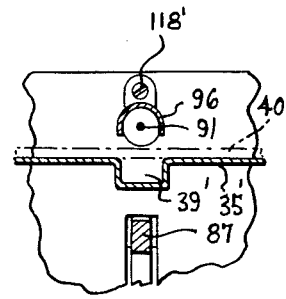
FIG. 8 is a fragmentary sectional view taken as on line 8—8 of FIG. 7 and looking in the direction indicated by the arrows.
Figure 7:
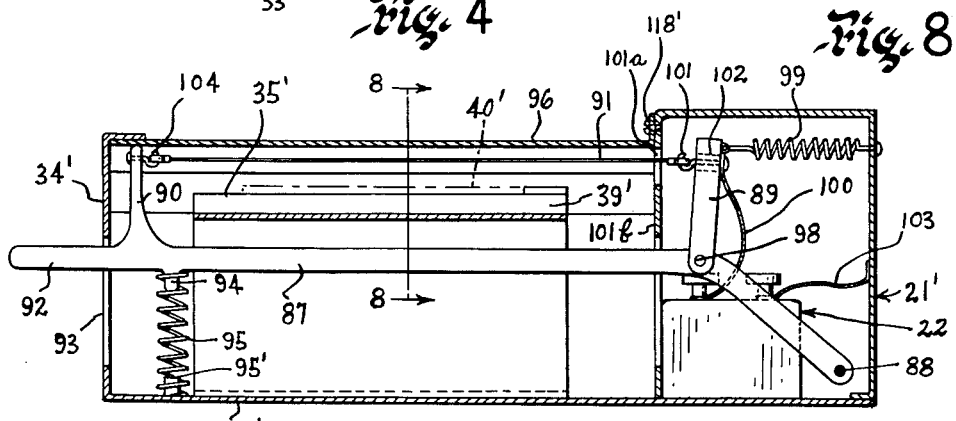
FIG. 7 is a sectional view similar to FIG. 3 of a modified form of the invention.

In FIG. 7 there is shown a further modification of the invention which comprises a bracket 87 pivotally attached at 88 to the base inwardly of the housing 21'. In this instance the platform 35' is stationary and the bracket 87 extends beneath said platform. The said bracket 87 has uprights 89 and 90 adjacent its opposed ends to which the opposed ends of a fine resistance wire 91 is attached in a manner similar to the cutting wire 29 described above. In this instance the upright 90 has a handle 92 which extends outwardly of a slot 93 in the upwardly extending hand rest portion 34'. Beneath the bracket 87 and carried by a depending pin 94, is a compression spring 95 having its lower end engaging the base 33' and which is adapted to engage an upstanding pinlike member 95'. The spring 95 normally urges the bracket 87 in an upward direction. In this instance the housing 21' is provided with a relatively long and narrow member 96 having a U-shaped cross section, see FIG. 8, in which the cutting wire 91 is initially retained when the bracket 87 is in its uppermost position so that the wire 91 will be protected from circulating air and will thereby be permitted to be heated to maximum temperature. In this instance, the plastic sheeting or tile 40' is placed on the platform 35' beneath the wire 91 and the cut is made through said plastic sheeting or tile by manually grasping the handle 92 and depressing the bracket 87 about its pivot 88 whereby the wire 91 will be pressed through the sheeting and into a channel 39' in the platform similar to the channel 39 of FIG. 1.

The wire 91 is tensioned by pivotally connecting the upright 89 to the bracket 87 as illustrated at 98 and by tensioning said upright about its pivot in a direction away from the upright 90 by a coil spring or the like 99. The circuit is formed through the wire 91 by a lead 100 from one pole of the transformer connected to the hook 101 to which one end of the wire 91 is attached. The hook 101 is insulated from the upright by a suitable sleeve of insulating material 102. The opposite pole of the transformer is grounded to the housing through the lead 103 thereby completing the circuitry through said wire 91.

The wire 91 may be readily removed or interchanged by unlatching it from the hook 104 and by then pulling it against the tension of the spring 99 to draw the hook 101 outwardly of the opening 101a in the housing and thereafter unlatching it from said hook 101.

The platform 35' is provided with scales similar to scales 42, 77 and 81 as described in the device of FIG. 1 to control the location and angles of cut.

In FIGS. 10 and 11 there is shown a further modification wherein the cutting wire 105 is wound on a spool 106 which is tensioned internally by a spring 107 attached at one end 108 to a pivot rod 109 and at its opposite end 110 to the spool which functions to tension the wire 105 as it is drawn from said spool. The wire 105 is provided with a looped end 111 which is adapted to be attached to a hook 112 carried by the housing similar to the other cutting wires described above. The wire is drawn through a guide eye 113 of insulation material as it is drawn from the spool 106 and the end 111 is manually formed on the end thereof for attachment with the hook 112 by merely forming a loop and twisting the wire on itself to form the loop. In this instance the wire engages a spring tensioned contact 114 connected by the lead 27 with one of the terminals of the transformer 22 and the hook 112 is grounded to the other terminal as previously stated above in order to complete the circuit through said wire.

If the wire should become broken or otherwise damaged, a new section is drawn from the spool 106, it being manually provided with a loop 111 and again attached to the hook 112. In each instance the spring 107 retains a tension on said wire 105.

Due to the fact that the energy is directed through the wire by the contact 114' at one end thereof with the opposite end of the wire being grounded, the wire will heat only intermediate the hook 112 and the contact 114'. In this instance, the wire 105 may be either carried by a bracket similar to the bracket 87 which may be lowered into a groove similar to groove 39' through the material to be cut or may be stationarily supported such as in the construction shown and described in the device illustrated in FIGS. 1 and 3 in which instance the platform 35 is depressed to cause the material supported thereby to be moved downwardly or upwardly through the cutting wire.

In FIG. 14 there is shown a further modification wherein the cutting wire 114 is attached at one end thereof to a screw member 115 whereby it may be tightened by rotation of the screw. The screw is provided with a lock nut 116 by means of which it may be locked in its adjusted position. The device is otherwise similar to the devices of FIGS. 1 and 7.

It is to be understood that all of the modifications may be used and embodied in any of the devices of the invention.

The above arrangements, as described particularly in connection with the devices illustrated in FIGS. 1 and 7, are for making straight line cuts through the plastic sheeting. However, the said devices of FIGS. 1 and 7, as shown in FIG. 2, may be set in an upright position utilizing the end wall of the housing 21 as a base and cuts of different configurations may be made by guiding the plastic sheet through the heated wire 29 or 91 as the case may be in a manner similar to guiding material through a band saw. In this instance, the sheet material is rested upon the upper surface 97 or 101b. This arrangement, therefore, provides the devices with a dual function, namely, that of forming straight line cuts either parallel with a side edge of the sheeting, angular cuts with respect to an edge of the sheeting or cuts of different configurations. When the device of FIG. 7 is used in the above manner the U-shaped member 96 is detached by removing the screw 118'.

The line current mentioned above is of the 115 volt A.C. type and the transformer 22 is such as to reduce this voltage to about 6.3 volts A.C. for the purpose of heating the wire 29 to the desired temperature or any desired line voltage and suitable transformer or other voltage reducing means may be used.

The devices set forth above may be used for cutting any thermoplastic, burnable or other similar material. In addition to cutting plastic tile it can be used for removing sprues, edge flashes or the like from the cut material.

The device additionally may be used for heating and sealing plastics together or for heating plastics for bending as desired by merely holding the sheet plastic material over the heated wire.

Figure 18:
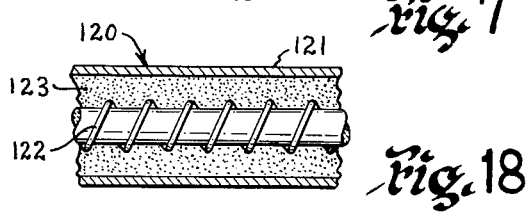
FIG. 18 is a fragmentary enlarged sectional view of a modified form of cutting wirelike member.

In FIG. 18 there is shown a fragmentary enlarged cross-sectional view of a modified form of wirelike cutting member 120 which may be used instead of the single strand-type wire 29 such as shown in FIGS. 1 and 3. In this instance the wirelike cutting member 120 comprises a sheath 121 of stainless steel or other heat resistance material internally of which is provided, a heating coil 122 of resistance wire similar to the wire used for the member 29 and which may be wound on a suitable mandrel and embedded within ceramic powder or the like 123 internally of the sheath. The heating coil 122 is connected with the transformer 22 or other suitable current control means in a manner similar to the wire 29 and is provided on its opposed ends with suitable clamp-on hooklike clips by means of which it may be attached to the hooks 49 and 50 of the device of FIGS. 1 and 3 or 101 and 104 of the device of FIG. 7 or any of the other modified forms of tensioning means.

The cutting member illustrated in FIG. 18 is initially formed in the above-described manner to a size relatively large in diameter and is thereafter drawn down to the diameter desired by running the said assembly through suitable reducing rolls or other suitable reducing dies in a conventional manner. The heating coil, due to the use of the ceramic powder internally of the sheath, retains its initial dimension while the sheath may be reduced down to 1/16" or 1/8" diameter, it being understood, of course, that the heating coil is initially formed to a diameter which will permit this reduction.

While the above devices have been described as using a transformer to reduce the current, it is to be understood that any suitable current controlling means may be used such as a resistor in series with the line current or any other suitable source of power such, for example, as a self-contained battery or the like and which will generically be referred to hereinafter in the claims as energizing means.

While the cutting wire of the various devices has been described as being fine, any suitable desired diameter may be used.

The switch 26 referred to in connection with FIG. 6 may be in the form of a micro or other suitable switch mounted beneath the platform 35 on a suitable support 118 connected by screws or the like 119 to the upright 31, as shown in FIG. 3. The structure shown in FIG. 7 may also be provided with a similar switch arrangement located beneath the lever 87.

In the construction shown in FIG. 3 a suitable blade spring 124 is provided on the platform 35 so that when the platform is moved in a downward direction such movement will operate the switch and close the circuit to the wire 29 to cause the same to be energized and heated. Movement of said platform 35 in the opposite direction by the springs 43 will force the blade spring 124 away from the switch and cause the same to open the circuit to the wire 29 whereby no current will flow therethrough. The same function applies to the device of FIG. 7.

It is further to be understood that the term cutting wire referred to hereinafter in the claims is to include either the single wire or the assembly such as shown in FIG. 18.

From the foregoing description it will be seen that simple, efficient and economical means have been provided for accomplishing all of the objects and advantages of the invention, and it will be apparent that many changes may be made in the details of construction without departing from the spirit of the invention as expressed in the accompanying claims. It is to be understood, therefore, that the devices shown and described herein are set forth only by way of illustration.

Having described our invention, we claim:

1. A device of the character described comprising a base, energizing means adjacent one end of said base to which a source of electrical energy may be attached, a cutting wire supported by said base in spaced relation therewith and having electrical connections with the energizing means and a relatively flat platform intermediate said base and said wire pivotally supported for movement in a direction substantially normal to the plane of said platform toward and away from said wire.

2. A device of the character described comprising a base, energizing means adjacent one end of said base to which a source of electrical energy may be attached, a hand rest portion adjacent the opposite end of said base, a cutting wire supported in spaced relation with the base intermediate the energizing means and hand rest portion and having electrical connection with said energizing means to be heated thereby, and a relatively flat platform intermediate said base and said wire pivotally supported for manual movement by a hand resting on said hand rest means in a direction substantially normal to the plane of said platform toward and away from said wire.

3. A device of the character described comprising a base, a transformer adjacent one end of said base to which a source of electrical energy may be attached, a cutting wire member supported in spaced relation with the base and having electrical connections with the transformer to be heated thereby, a platform member intermediate said base and said wire member lying in a plane disposed in the direction of the longitudinal axis of the wire member, means permitting the movement of one of said members toward and away from the other of said members in a direction substantially normal to said plane and a channel-like member disposed in a direction longitudinally of said cutting wire member and in which the major portion of said cutting wire member is initially located prior to the movement of one of said members toward and away from the other so as to be shielded from circulating air during the heating thereof.

4. A device of the character described comprising a base, a transformer supported adjacent one end of said base to which a source of electrical energy may be attached, a platform-type supporting member carried by said base, a cutting wire supporting member carried by said base, a cutting wire carried by said wire-supporting member, one of said supporting members being pivotally connected to said base for movement toward and away from said other member, shield means extending longitudinally of the cutting wire in which the major portion of the wire is initially supported for shielding said wire against circulating air prior to the movement of one of said supporting members toward and away from said other member and means electrically connecting said cutting wire to said transformer.

5. A device of the character described comprising a base, a transformer supported adjacent one end of said base to which a source of electrical energy may be attached, a platform-type supporting member carried by said base, a cutting wire supporting member carried by said base, a cutting wire carried by said wire-supporting member, one of said supporting members being pivotally connected to said base for movement about said pivot toward and away from said other member and means electrically connecting said cutting wire to said transformer.

6. A device of the character described comprising a base, a transformer supported adjacent one end of said base to which a source of electrical energy may be attached, a platform-type supporting member carried by said base having a channel extending longitudinally thereof, a scale member having a straight edge on said platform, a cutting wire supporting member carried by said base, a cutting wire carried by said wire supporting member with the major portion of said cutting wire initially disposed in said channel, one of said supporting members being pivotally connected to said base for swinging movement about said pivot toward and away from the other of said members and means electrically connecting said cutting wire to said transformer.

7. A device of the character described comprising a base, a transformer supported adjacent one end of said base to which a source of electrical energy may be attached, a cutting wire supporting member carried by said base, a cutting wire carried by said wire supporting member, a platform-type supporting member carried by said base and having a longitudinal channel therein in which said cutting wire is initially located, one of said supporting members being pivotally connected to said base for swinging movement about said pivot toward and away from said other supporting member and means for electrically connecting said cutting wire to said transformer.

8. A device of the character described comprising a base, energizing means supported adjacent one end of said base to which a source of electrical energy may be attached and an upwardly extending member adjacent the opposed end of said base, a tensioning member supported adjacent the energizing means, a cutting wire connected at one end to said tensioning member and at its opposed end to the said upwardly extending member, means for electrically connecting said wire to said energizing means, and a platform lying in a plane disposed generally in the longitudinal direction of the cutting wire, said platform being pivotally supported adjacent one end thereof intermediate said base and said cutting wire and being movable from said plane toward and away from said cutting wire.

9. A device of the character described comprising a base portion having a housing adjacent one end thereof and an upright adjacent its opposed end, said housing having an outer relatively flat end surface substantially normally disposed with respect to the plane of the base, a transformer in said housing to which a source of electrical energy may be attached, a hook supported in said housing by a member yieldingly urged in a direction opposite to the upright, said upright having a hook thereon, a cutting wire having its opposite end portions detachably connected with said respective hooks and to be tensioned by said means yieldingly urged in a direction away from said upright, means for electrically connecting the transformer to said cutting wire and platform means pivotally connected to said housing intermediate the base and said wire with the plane thereof disposed in the general longitudinal direction of the wire for movement from said plane toward and away from said wire.

10. A device of the character described comprising a base portion having a housing adjacent one end thereof and an upright adjacent its opposed end, said housing having an outer relatively flat end surface substantially normally disposed with respect to the plane of the base, a transformer in said housing to which a source of electrical energy may be attached, a lever pivotally supported in said housing, connection means on said lever, means for yieldingly urging said lever in a direction away from the upright, said upright having connection means thereon, a cutting wire having its opposed end portions detachably connected with said respective connection means and to be tensioned by said yieldingly urged lever, means for electrically connecting the transformer to said cutting wire, platform means lying in a plane intermediate the base and said wire and being pivotally connected to the housing for movement toward and away from said wire and means for yieldingly urging said platform about its pivot toward said wire, said platform having a longitudinal channel in which the wire is normally disposed to be shielded from circulating air during the heating thereof.

11. A device of the character described comprising a base, means on said base for connection with electrical energizing means, a cutting wirelike member supported on said base and having electrical connections with said means for connection with electrical energizing means to be heated to a desired temperature, shield means carried by said base in which said wire is initially disposed during said heating, a platform member intermediate said base and said wire member having a relatively flat portion lying in a plane disposed in the direction of the longitudinal axis of the wire member for supporting material to be cut in said plane and means permitting one of said members to be moved toward and away from the other of said members in a direction such as to cause said wire to move out of said shield means and to engage and cut said material.

References Cited in the file of this patent

UNITED STATES PATENTS

| | | |
|---|---|---|
| 203,654 | Seaman | May 14, 1878 |
| 771,518 | Wilson | Oct. 4, 1904 |
| 1,661,354 | Ayre | Mar. 6, 1926 |
| 2,216,604 | Schwimmer | Oct. 1, 1940 |
| 2,226,413 | Schwimmer | Dec. 24, 1940 |
| 2,419,184 | Young | Apr. 15, 1947 |
| 2,452,738 | Elstad | Nov. 2, 1948 |
| 2,551,811 | Mueller | May 8, 1951 |
| 2,601,878 | Anderson | July 1, 1952 |
| 2,692,328 | Jaye | Oct. 19, 1954 |